United States Patent Office 3,616,611
Patented Nov. 2, 1971

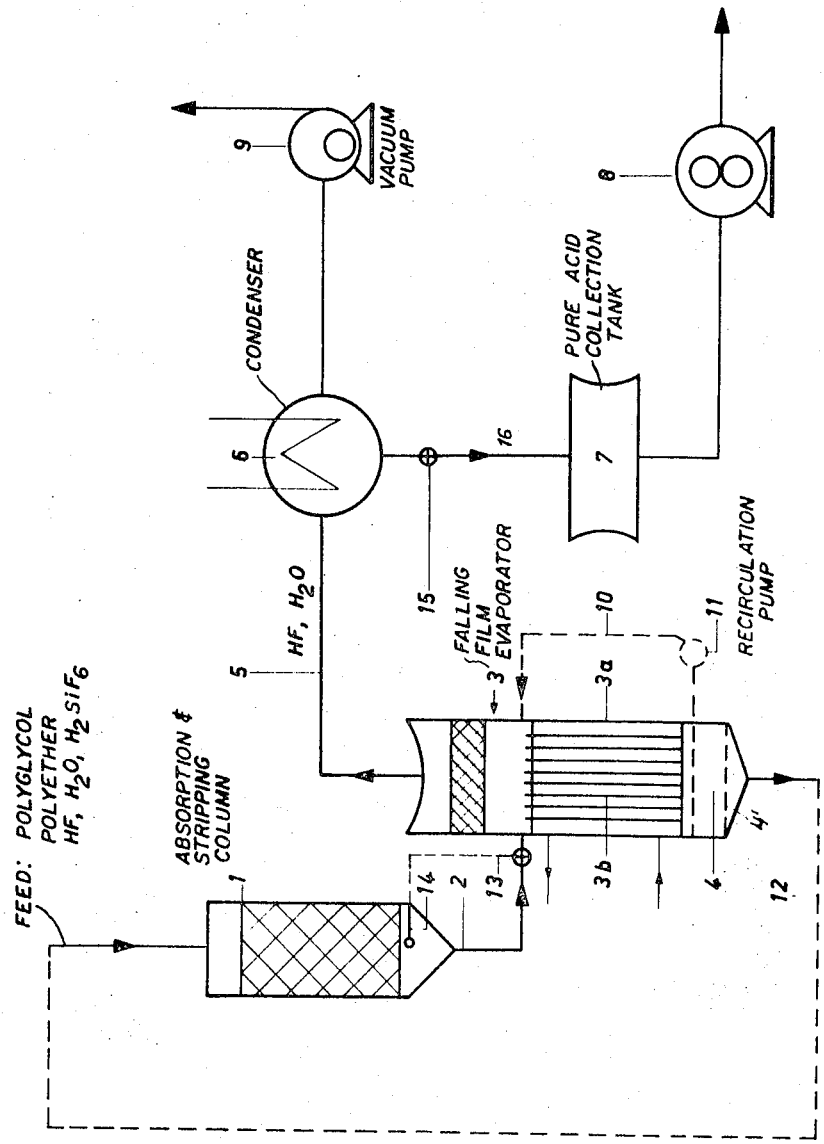

3,616,611
APPARATUS FOR THE CONTINUOUS RECOVERY
OF ACIDS FROM INERT ORGANIC MEDIA
Renato Gentili, Muttenz, Switzerland, assignor to
Buss AG, Basel, Switzerland
Filed Dec. 13, 1968, Ser. No. 783,553
Claims priority, application Germany, Dec. 22, 1967,
P 16 19 843.9
Int. Cl. B01d 3/10, 15/00
U.S. Cl. 55—165                                2 Claims

ABSTRACT OF THE DISCLOSURE

Apparatus for the continuous recovery of pure acids and water-acid mixtures, which are present in contaminated inert organic media such as absorber solutions, comprising:
(a) heating means to heat said absorber solutions;
(b) desorption means including a falling-film evaporator operating under vacuum to separate a desorbed acid-water mixture which has much higher HF strength than the azeotrope;
(c) means for withdrawing the desorbed water-acid mixture in the vapor phase from said falling-film evaporator;
(d) condensing means to liquefy said desorbed water-acid mixture; and
(e) pumping means and recycling means to transport the absorbent from the evaporator to an absorption tower for re-use.

---

A device for the continuous recovery of acids or acid-water mixtures which are present in inert reacting mixtures as absorber solutions comprising a falling-film evaporator embodying a shell and having a feed line, an exhaust line and a recirculation-line connected to the upper and lower part of said shell; a single or multiple condenser and a vacuum pump, said condenser and said vacuum pump are connected by means of said exhaust line in series to said evaporator.

A number of processes are known to separate acids out of organic mixtures, for example aliphatic polyethers or polyols. In these known processes the acids are separated by boiling, with steam stripping or gas or chemical reaction in their pure form and are then reconcentrated, whereas the absorbing organic mixture is re-generated or transformed in any other known manner.

All these known processes have the disadvantage that too much energy is required, whereas the separation efficiency gives values less than desirable.

These disadvantages are considered to be very important and have hindered or even made impossible technically practicable applications.

Such for example up to now it has not been possible to separate mixtures tending to chemical instability at higher temperatures in a single column if the total pressure drop of the vapours rising through the column required it to overstep the maximum permissible temperature or resulted in too great construction heights.

Also because with equal dynamic steam loads smaller throughputs correspond to vacuum conditions than at normal pressure, it has been necessary to find a novel column construction to permit highest throughputs at the smallest pressure loss corresponding to the theoretical separation.

On the other hand it is very desirable to recover water diluted acids from organic solvents, especially with the cleaning of waste gases so that the costs of the cleaning operation may be compensated at least in part.

If acids are absorbed out of gases, then often non-desirable admixtures are absorbed as well. Even if these have been separated-out in a perfect processing manner, before the acid recovery follows as the next step, many times it cannot be prevented that traces of contamination exist to make the recovery more difficult.

It is an object of this invention to exclude these disadvantages and to propose a process which will have the following characteristics: small energy requirement for the separation; complete separation of acid without contaminents; these shall stay in the absorbent, to be removed later in case; no decomposition of the absorbent.

The proposed process for the continuous recovery of acid or acid-water mixtures which are present in inert reacting organic mixtures as absorber solution comprising the following steps:
(a) Heating said absorber solutions for desorption in a falling-film evaporator under vacuum in order to result a desorbed mixture;
(b) Withdrawing the desorbed acid-water mixture from said falling-film evaporator;
(c) Condensing said desorbed acid-water mixture in a condenser;
(d) Leading the absorbent for re-use out from said evaporator.

The device for the continuous recovery of acids or acid-water mixtures which are present in inert reacting mixtures as absorber solutions comprising a falling-film evaporator embodying a shell and having a feed line, an exhaust line and a recirculation-line connected to the upper and lower part of said shell; a single or multiple condenser and a vacuum pump, said condenser and said vacuum pump are connected by means of said exhaust line in series to said evaporator.

The attached drawing shows schematically an example of the proposed device.

Referring now to that drawing the device and proposed process will be explained more in detail, for which the separation will be described of water diluted hydrofluoric acid out of a polyglycol with average molecular weight around 400, because this is known to present especially difficult technical processing problems.

The device consists in a new type falling-film evaporator 3 which is formed by a shell 3a and a tube bundle 3b. The individual tubes of the bundle 3b are externally heated, which is not shown on the drawing. Below the tube bundle 3b is provided a sump 4 divided by a dripping plate 4'. The falling-film evaporator 3 is provided above the tube bundle with the feed line 2 and the exhaust line 5. The feed line is provided with a valve 13 controlled by a float 14. This is sited in the sump of a preceding absorption and stripping column 1 and prevents flooding of the evaporator 3 as well as a break trough of the vacuum into the stripping column 1, which is connected by the line 2 with the falling-film evaporator. The falling-film evaporator is furthermore equipped with a distribution arrangement, which is not shown, at the entry of line 2 in order that the solution is uniformly distributed to the tube bundle. A feed back line 12 is branched to the lower end of sump 4 and connects to the absorption and stripping column 1. Further a re-circulation line 10 with circulation pump 11 is planned to be connected immediately above the tube bundle to the evaporator 3.

The exhaust line 5 is connected over the inserted condenser 6 to a vacuum pump 9 which creates an under-pressure in the evaporator 3. The condenser 6 is connected by means of a discharge line 16 to an interlock outlet 15 and with a collecting tank 7 from which the accumulating pure acid can be withdrawn by pump 8.

When in continuous operation the feed line 2 transfers to the evaporator 3 from the absorption and stripping column approximately 5400 kgs. per hour absorber solution, containing by weight approximately polyglycol 80%, water 8%, HF 12% and traces of $H_2SiF_6$. Valve 13, controlled by float 14 ensures the regular feed and prevents flooding of the evaporator as well as a break through of the vacuum to the stripping column 1. If the liquid level in the sump of column 1 rises the valve opens and if the level drops the valve is throttled or even closed.

The interior of the falling-film evaporator is at approximately 20 torrs absolute pressure created by pump 9 and distributed uniformly down to the liquid level in sump 4. The solution flows down over the tube surfaces with film formation. The tubes of bundle 3b are heated on their outside in such a manner that the film temperature settles at approximately 125 degrees centigrade and an efficient desorption of the HF and water mixture occurs. This mixture passes through the exhaust line 5 into the condenser 6 which can be arranged as a single or multiple unit and out of which approximately 1100 kgs. per hour condensate with highest purity and HF content much higher than 50% which is over the azeotrope run off through the lock 15 which is for example a barometric type, into the collecting tank 7. This condensate has now only traces of contaminations in form of $H_2SiF_6$ under 0.01%.

Below the tube ends of bundle 3b a part of down-flowing solution is collected and re-circulated through line 10 by pump 11 to the upper part of the evaporator 3 where the recirculate again flows down the tubes. This allows to build the evaporator in a very short and compact manner and permits to keep low the thermal stress on the polyglycols. Approximately 4300 kgs. per hour of glycols plus water plus HF under 17% are withdrawn from sump 4 and are circulated back to column 1 for re-use.

The above described process results when compared to known processes in important energy savings at the same time the thermal stressing of the absorption vehicle is very small.

And also there can be no local overheating leading to vapour bubbles forming at the surface which when rising and exploding tear liquid droplets along which would lead to a decreased separation efficiency in view of quantity as well as quality.

What I claim is:

1. Apparatus for the continuous recovery of pure HF from polyglycol and polyether absorbing liquid containing HF, water, and $H_2SiF_6$ as absorbed impurities therein, comprising:
    (a) an absorption and stripping column having a liquid sump at the base thereof and a float in said liquid sump which controls the liquid feed of said polyglycol or polyether absorbent containing HF, water and impurities to a desorbing stage;
    (b) an inlet connecting line between said absorption and stripping column and said desorbing stage;
    (c) a desorbing stage consisting of a vacuum-operated falling-film evaporated fed by liquid from said connecting line under the control of said float;
    (d) valve means responsive to said float which prevent flooding said evaporator by liquid passing through the inlet connecting line;
    (e) said evaporator comprising:
        (1) vacuum pump means to maintain a uniform vacuum throughout said evaporator between the inlet connecting line at the top to the liquid collecting at the bottom thereof;
        (2) a cylindrical shell constituting the vacuum-tight housing of said evaporator;
        (3) liquid distribution means at the top of said shell to uniformly feed liquid from the inlet connecting line through said valve means;
        (4) vertical tubes in a bundle with exterior heating means which are uniformly heated and provide the tubular surface for falling-film formation from which vacuum evaporation takes place at constant predetermined temperature;
        (5) a vapor exhaust line at the top of said shell through which water and volatile impurities are led to a condensation stage;
        (6) a recycling line and circulating pump, said recycling line having an outlet above said vertical tubes and its inlet in the liquid sump of said evaporator, said pump recirculating a major portion of the liquid after film evaporation which contains a small amount of HF;
    (f) a condenser connected to said evaporator by said vapor exhaust line which cools and liquefies the evaporated HF and water with only traces of $H_2SiF_6$ impurity;
    (g) a liquid outlet discharge line connected to said condenser; and,
    (h) an interlock outlet between said discharge line and said condenser which permits withdrawal of recovered HF without breaking the vacuum in the condenser, inlet connecting line, and falling evaporator.

2. Apparatus as claimed in claim 1 wherein said cylindrical shell for the evaporator is provided with a perforated horizontal divider between the bottom of said shell and the lower portion of said tubes and the inlet to said recycling zone is located above said divider while the return line to the absorption and stripping tower is located below said divider.

References Cited
UNITED STATES PATENTS

| | | | |
|---|---|---|---|
| 2,514,944 | 7/1950 | Ferres et al. | 203—89 X |
| 2,568,889 | 9/1951 | Hanson et al. | 23—153 X |
| 2,537,076 | 1/1951 | McCaulay et al. | 23—153 |
| 2,791,551 | 5/1957 | Ash et al. | 203—89 |
| 3,351,119 | 11/1967 | Rohenblad | 203—89 X |
| 3,366,158 | 1/1968 | Rohenblad | 202—236 X |
| 3,431,071 | 3/1969 | Simpson et al. | 23—153 |

NORMAN YUDKOFF, Primary Examiner

D. EDWARDS, Assistant Examiner

U.S. Cl. X.R.

55—71; 23—153; 203—42, 89, 91; 202—235, 236